UNITED STATES PATENT OFFICE.

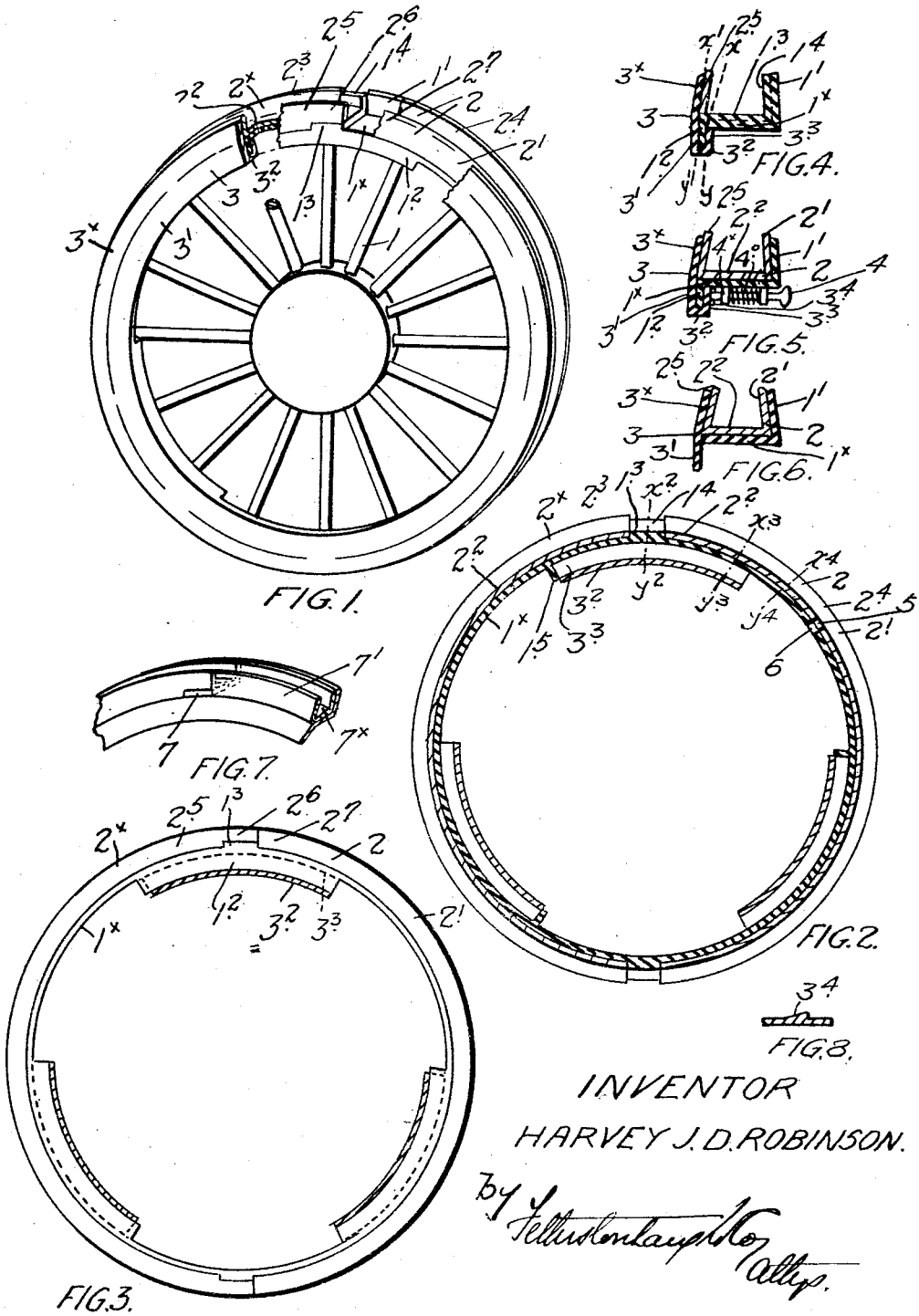

HARVEY JOHN DONALDSON ROBINSON, OF CALGARY, ALBERTA, CANADA.

AUTOMOBILE WHEEL AND TIRE-RIM.

1,366,281.  Specification of Letters Patent.  Patented Jan. 18, 1921.

Application filed November 8, 1918. Serial No. 261,693.

*To all whom it may concern:*

Be it known that I, HARVEY JOHN DONALDSON ROBINSON, of the city of Calgary, in the Province of Alberta, Canada, have invented certain new and useful Improvements in Automobile Wheels and Tire-Rims, of which the following is the specification.

My invention relates to improvements in automobile wheels and tire rims and the object of the invention is to devise a wheel and tire rim whereby the rim may be easily and quickly detached from the wheel and the tire detached from the rim and it consists essentially of the following arrangement and construction of parts as hereinafter more particularly explained.

Figure 1, is a perspective view of my wheel and rim showing them assembled together, the parts being broken away to exhibit their construction.

Fig. 2, is a sectional view on line $x$—$y$ Fig. 4.

Fig. 3, is a sectional view on line $x'$—$y'$ Fig. 4.

Fig. 4, is a cross sectional view on line $x^2$—$y^2$ Fig. 2.

Fig. 5, is a sectional view on line $x^3$—$y^3$ Fig. 2.

Fig. 6, is a sectional view on line $x^4$—$y^4$ Fig. 2.

Fig. 7, is a sectional perspective detail showing my construction adapted to a tire carrier.

Fig. 8, is a sectional detail showing the locking projection co-acting with the spring plunger which locks the parts in their final position.

In the drawings like characters of reference indicate corresponding parts in the various figures.

1 indicates an automobile wheel provided with a fixed rim $1^x$. The inner edge of the rim is provided with an upwardly extending inclined flange $1'$ and at its outer edge with inwardly extending segmental flanges $1^2$ spaced at suitable distances apart. 2 indicates my removable tire rim which is formed in two portions $2^x$ and $2'$, each portion being a little less than semi-circular. By this means when the portions $2^x$ and $2'$ are placed around the fixed rim of the wheel an intervening space is left at diametrically opposite points, into which space extends a horizontal lug portion $1^3$ of the same thickness as the lower portions $2^2$ of the removable rim, the lug $1^3$ being provided with an upward extension $1^4$ extending up the inner face of the inner flange $1'$ of the fixed rim. This vertically extending portion is interposed between the inner flange portions $2^3$ and $2^4$ of the rim portions $2^x$ and $2'$. The outer flange $2^5$ of the rim portion $2^x$ is provided with an extension $2^6$ which extends over the lug portion $1^3$ so as to abut against the opposite face of the outer flange portion $2^7$ of the rim portion $2'$. The rim portions $2^x$ and $2'$ are secured in place by an annular member 3, which is in the form of an annular plate, the outer portion $3^x$ of which is inclined to correspond with the inward incline of the rim flange portions $2^5$ and $2^7$. The inner portion $3'$ of the annular plate 3 fits against the inwardly extending portions $1^2$, extending inwardly beyond the inner edge of such portions, the inwardly extending edge being provided with hook-like portions $3^2$ which are segmental in form and are designed to pass between the intervening spaces formed between the lug portions $1^2$ of the fixed rim. One end of each of the lug portions $1^2$ is provided with an inwardly extending portion forming a radial projection $1^5$ which forms a stop against which the inner portion $3^3$ of each hook contacts when it is brought to the final position as will be hereafter seen. Each hook portion $3^2$ in proximity to the opposite end to the projection $1^5$ is provided with an inwardly extending projection $3^4$.

4 indicates a spring plunger held in guiding lugs $4^x$ extending from the inner face of the fixed rim $1^x$, the plunger being held in its inward position by the compression spring $4^c$. The projection $3^4$ is preferably ratchet-shaped for a purpose which will hereinafter appear. The hole for the valve is located in any desired position as at 5 in the rim portion $2'$ which is in alinement with a corresponding orifice 6 in the corresponding portion of the fixed rim.

Having described the principal parts involved in my invention I will briefly describe how the removable tire rim is assembled with the wheel and the tire placed thereon.

The portion of the rim $2'$ containing the hole 5 for the valve is first placed against the rubber tire so that the valve passes through the hole. The other portion of the rim $2^x$ is then placed against the inner part of the rubber tire, this being easily done, the rim being formed in two portions which are less than a semi-circle. The operator then with a hand holding each portion of the rim, the portion 2' containing the valve hole 5 is placed upon the fixed rim $1^x$ of the wheel with the valve passing through the hole 6. Then an iron shoe, such as is commonly used in putting on a tire, is passed underneath the other half $2^x$ of the rim with the tip of the shoe resting on the outer edge of the fixed rim. That part of the rim is thereby forced inwardly along the shoe on to the fixed rim of the wheel and then the shoe withdrawn. It will be understood that the rim portions $2^x$ and 2' are of the same width as the fixed rim. The annular plate 3 is then placed against the outer face of the rim portions $2^x$ and 2' so that the hook portions $3^2$ of the plate are passed through the intervening space between the lug portions $1^2$, the upper edge of the portion $3^3$ of the hook bearing, of course, in this position against the internal periphery of the fixed rim. The annular plate 3 is then given a turning movement so as to carry the hook portions $3^2$ over the lug portions $1^2$ until the portion $3^3$ of the hook portion $3^2$ is brought against the projection $1^5$. At the same time the spring plunger 4 springs over the ratchet tooth or projection $3^4$ so as to bear against the vertical face of the ratchet tooth and prevent the return movement of the plate 3. The rubber tire may then be filled with air.

In order to carry a spare tire filled with air upon a car a tire holder may be provided which is formed similarly to the above described construction with the exception, of course, that the hub and spokes of the wheel are dispensed with and the lug projection $1^3$ only extends a little way crosswise of the periphery of the fixed rim from the inner portion thereof or from the lug portion $1^4$. The balance of the lug portion $1^3$ is formed by an inserted block 7. The hole for the valve in this construction, of course, must extend to the outer edge of the portion corresponding to the fixed rim $1^x$, so as to permit the tire to be slipped off this portion without twisting the parts of the rim. The rubber tire in this construction is mounted on the rim $7^x$ corresponding to the rim 2 in Fig. 1 and the rim 7' on the holder $7^x$ which corresponds to the fixed rim $1^x$ indicated in Fig. 1 with a block 7 inserted between the portions of the rim 7'. The tire is then filled with air, the pressure causing the rim portions to pinch the loose block 7 tightly.

When the tire is to be removed to be placed upon the wheel the two rim portions are drawn off the portion $7^x$ with the block 7 held therebetween. After removing the plate 3 from the fixed rim the rim 7' is placed against the fixed rim $1^x$ with the loose block 7 against the ends of the lug portions $1^3$. The whole rim 7' is then forced inwardly so that the portions of the rim 7' slip on to the fixed rim and the block 7 is forced outwardly by the lug portions $1^3$ from between the rim portions 7', the lug portion $1^3$ taking the place of the block.

In removing the tire, of course, all that it is necessary to do is to withdraw the spring plunger 4, turn the plate 3 so that the hook portions $3^2$ may pass off the lug projections $1^2$ into the intervening space between the lug projections $1^2$ thereby freeing the plate 3 which is removed. As soon as this is done the rim portions $2^x$ and 2' may be pulled off the fixed rim and the rim portions being formed less than the semi-circle immediately they are withdrawn from the fixed rim loosen the tire thereon allowing it to be removed.

From this description it will be seen that I have devised a very simple form of wheel and tire rim which will both allow of the removable rim being removed from the fixed rim and the tire from the first mentioned rim, which operation may be quickly and easily performed without any other tools than those which are commonly used in mounting a tire.

Although I have only shown one spring plunger 4 it will, of course, be understood that if desired a spring plunger could be used co-acting with the projection $3^4$ extending from each of the inturned portions $3^2$. I, however, preferably only use one for the reason that in removing one hand would be required to hold back the spring and the other to rotate the disk.

What I claim as my invention is:

The combination with a wheel having a fixed rim portion provided on one side with an outwardly extending flange and on the opposite side with inwardly extending spaced projections, of a sectional tire rim mounted on said fixed rim and engaged against the flange of the latter, a ring-like retainer plate for the tire rim having its outer edge portion engaging said tire rim and its inner edge portion interlocking with the projections of the fixed rim to lock the tire rim against the flange of said fixed rim and means releasably securing said retainer plate in interlocking engagement with said projections.

HARVEY JOHN DONALDSON ROBINSON.

Witnesses:
MABEL G. EASTER,
VIVIAN J. HAVER.